United States Patent
Kozakura et al.

[11] Patent Number: 6,068,568
[45] Date of Patent: May 30, 2000

[54] SILENT CHAIN

[75] Inventors: Nobuto Kozakura; Toyonaga Saito, both of Hanno; Tsutomu Haginoya, Iruma; Takero Nakagawa, Osaka, all of Japan

[73] Assignee: Tsubakimoto Chain Co., Osaka, Japan

[21] Appl. No.: 08/975,152

[22] Filed: Nov. 20, 1997

[30] Foreign Application Priority Data

Dec. 12, 1996 [JP] Japan ................................. 8-332331

[51] Int. Cl.⁷ ........................ F16G 13/04; B21L 15/00; B21L 3/04
[52] U.S. Cl. ............................ 474/212; 59/29; 59/30
[58] Field of Search .............................. 474/207, 212; 148/216, 319; 59/8, 29, 30

[56] References Cited

U.S. PATENT DOCUMENTS

| | | | |
|---|---|---|---|
| 3,535,871 | 10/1970 | Jeffrey | 59/8 |
| 4,265,134 | 5/1981 | Dupoyet | 474/231 |
| 4,711,676 | 12/1987 | Kitaori et al. | |
| 4,985,092 | 1/1991 | Kaede et al. | 148/319 X |

FOREIGN PATENT DOCUMENTS

| | | |
|---|---|---|
| 57-085967 | 5/1982 | Japan . |
| 57-60422 | 12/1982 | Japan . |
| 61-41984 | 2/1986 | Japan . |
| 61-264170 | 11/1986 | Japan . |
| 09217796 | 8/1997 | Japan . |

*Primary Examiner*—David A. Bucci
*Assistant Examiner*—Brandon C. Stallman
*Attorney, Agent, or Firm*—Armstrong, Westerman, Hattori, McLeland and Naughton

[57] ABSTRACT

A silent chain is provided which has reduced elongation based on wear and which is capable of maintaining a high accuracy over a long period of time in use. The inner surfaces of pin holes formed in at least joint trains of plates have been subjected to shaving, and a hard layer of at least one hard metal carbide selected from a group including CrC, TiC, VC and NbC, is formed on the surface of each pin. By shaving the inner surface of each pin hole, the surface pressure applied between the pin hole inner surface and the pin inserted therein becomes lower, whereby the wear of the pin and the pin hole is diminished. Further, since the hard layer on the pin surface is very hard and is chemically stable, the affinity of each plate for the inner surface of each pin hole formed therein is small. Thus, even under the condition of boundary lubrication, it is difficult for adhesion to occur between the pin hole inner surface and the pin inserted therein. Consequently, the amount of pin wear is lessened so that it becomes possible to minimize the elongation of the chain based on wear.

3 Claims, 5 Drawing Sheets

SILENT CHAIN

TECHNICAL FIELD OF THE INVENTION

The present invention generally relates to a silent chain and more particularly, to an improved silent chain having hard metal carbide surfaced pins in pin holes in at least the joint trains of plates with inner surfaces subjected to shaving.

DESCRIPTION OF THE RELATED ART

Silent chains for use in an engine or similar are known. The known silent chains, unlike roller chains, include a large number of plates which are bifurcated on one side. The known silent chains include a plurality of joint trains of plates and a plurality of guide trains of plates. Each of the joint trains of plates have at least two joint plates arranged in a row. Each of the guide trains of plates have two guide plates at both sides thereof and at least one joint plate between the guide plates all arranged in a row. The plates are superimposed and connected together using pins. In an outer engagement type silent chain, two surfaces, located outside the bifurcated portion, serve as surfaces for engagement with a sprocket. In contrast, in an inner engagement type silent chain, two surfaces, located inside the bifurcated portion, serve as surfaces for engagement with a sprocket.

Referring to FIG. 5, a conventional manufacturing method for the plates of the silent chain is shown. In the conventional manufacturing method, a blank B is moved to a working position, and pin holes $c_1$ and $c_2$ are formed simultaneously by means of punches P1 and P2 in a first step (a). Then, in a second step (b), the blank is punched into the contour of plate P by means of a punch P3. Alternatively, plates of a silent chain may be manufactured by having the contour of the plates punched from the blank first, and then having pin holes formed in the plate.

With respect to the pins to be inserted into the holes formed in each plate either a carburizing and hardening treatment (surface hardness: Hv 800 or so) or a carbonitriding treatment (surface hardness: Hv 850 or so) is applied to the surface of the pin material, which is carbon steel, in order to enhance the resistance to wear.

As shown in FIG. 6, however, in the plate P of the conventional silent chain fabricated in the above-described manner, the portion punched from the blank has both a smoothly shorn portion F and a roughly broken portion R. The proportion of the smooth surface portion F is only approximately 50% of the thickness of the plate P. Thus, the plate surface for engagement with a sprocket and the inner surfaces of the pin holes $c_1$ and $c_2$ are deteriorated in both positional accuracy and parallelism. As a result the silent chain may experience a one-sided contact of the inner surface of each pin hole and the pin inserted therein in use. In turn, this may cause a local increase of surface pressure, and the resulting local wear or stress concentration may lead to deterioration of the fatigue strength. Alteratively, the plate may tilt, resulting in an unbalanced load being applied to the toothed surface of the sprocket and either a local increase of surface pressure this accelerating the local wear of the toothed surface or a deterioration of the fatigue strength due to stress concentration.

Moreover, since the joint trains of plates move pivotally with respect to the pins, the wear of the inner surfaces of the pin holes of joint trains of plates becomes more conspicuous than the wear of the inner surfaces of the pin holes, because the pivotal movement of the plates in guide trains of plates is restricted with respect to the pins thereof.

Further, since the surface hardness of each plate after hardening is approximately Hv 550, the portion of each pin in contact with the associated pin hole formed in each plate of the joint trains of plates is subject to great wear. Thus, the above-described one sided contact of the pin with the pin hole inner surface causes wear of the contacted portion of the pin and the wear is about four times the amount of the wear of the foregoing plate. This is a serious cause of elongation based on wear and poses the most serious problem involved in the silent chain.

In an automobile timing chain, the occurrence of such wear elongation leads to an increase of operation noise, an error in valve timing, and deterioration of the transfer efficiency. In the worst case, serious problem may arise such as the chain striking on the toothed top of the sprocket, and tooth skip.

Additionally, with respect to the automobile timing chain, the number of revolutions of the crank shaft reaches about 7000 rpm and the chain speed in this condition becomes as high as 17 m per second. Therefore, the chain, even if lubricated forcibly, is used in a region which is close to its limit in a point of lubricity. As a result, when viewed from the standpoint of maintaining a lubricant film, the contact portion between each pin hole formed in each plate and the pin inserted therein is in a condition of boundary lubrication. Consequently, the contact portion between the pin and pin hole may experience abrasive wear as well as adhesive wear. Hence, the chain is apt to undergo elongation based on wear.

Further, in a timing chain for a diesel engine, the wear elongation of the chain is accelerated because a sulfur component contained in the gas-oil fuel reacts and sulfuric acid is mixed into the lubricating oil, so that corrosive wear occurs as the contact portion between each pin hole formed in each plate and the pin inserted therein. This coupled with a lapping effect induced by a slight solid component mixed into the lubricating oil which also serves to accelerate the wear elongation of the chain.

Accordingly, it is an object of the present invention to solve the above-mentioned problems of conventional silent chains by providing a silent chain of reduced elongation based on wear which is capable of maintaining a high accuracy over a long period of time in use.

SUMMARY OF THE INVENTION

According to the present invention, in order to achieve the above-mentioned object, an improved silent chain is provided having joint trains of plates adjacent to guide trains of plates so that the joint trains of plates and the guide trains of plates are connected to each other by pins. At least the joint trains of plates have pin holes into which the pins are inserted. The pin holes have inner surfaces which have been subjected to shaving. A hard layer of at least one hard metal carbide selected from a group including, CrC, TiC, VC and NbC, is formed on the surface of each pin.

The term "shaving" is defined to include the following work. A punched portion is obtained by punching a blank with a punch. Then, the punched portion may be reduced by using a rod-like or columnar shaving tool, having a contour slightly larger than the edge contour of the punched portion, to shave off a small amount of the edge contour. Thus, a rough surface and droop resulting from the punching work are removed. In this way, the surface roughness of the punched portion is remedied and the surface accuracy thereof is improved.

The "hard layer" as referred to herein, means a layer having a surface hardness of Hv 1800 or more. The hard layer is obtained by forming any one of a group of Cr, Ti, V and Nb carbides, or a composite thereof, on a surface of a low carbon steel. The hard layer is formed by a heat treatment at a high temperature of 900 to 1800° C. for 8 to 25 hours using a molten salt furnace or a powder furnace. The pin is preferably made of low carbon steel with a carbon content of 0.1% to 0.4%. Its preferable that the surface of the pin of low carbon steel has been subjected to carburizing to increase the carbon content of the surface layer to between 0.7% and 1.1%. However, the pin maybe made of a high carbon steel with a carbon content of between 0.7% and 1.1%.

Preferably, in the above-described silent chain, engaging surfaces of at least one of the joint trains of plates and the guide trains of plates for engagement with a sprocket have been subjected to shaving.

Preferably, a high carbon steel, containing 0.7% to 0.7% of carbon, is used as the material for the pin.

By subjecting the inner surfaces of pin holes formed in at least the joint trains of plates to shaving, the area of contact between the inner surface of each pin hole and the pin inserted therein increases. Furthermore, the perpendicularity between the inner surface of each pin hole in each plate having been subjected to shaving and the plane of the plate is improved. As a result, even under a constant tension acting on the chain, the surface pressure applied between the shaved pin hole inner surface and the pin becomes smaller, so that the wear on the pin hole and the pin is diminished.

Besides, since the hard layer formed on the pin surface is very hard and chemically stable, the affinity thereof for the pin hole inner surface is small and hence it is difficult for adhesion to occur between the pin hole inner surface and the pin even under the condition of boundary lubrication. Moreover, it is difficult for corrosion to occur even in contact with sulfuric acid or any other corrosive component mixed in the lubricating oil. Thus, in the presence of the hard layer, the amount of wear of each pin is extremely small and so is the amount of wear elongation of the chain.

Further, in the case where engaging surfaces of at least one of the joint trains of plates and the guide trains of plates for engagement with a sprocket have been subjected to shaving, the perpendicularity of the engaging surface of each shaved plate relative to the plate plane is improved. Therefore, the plate abuts the sprocket toothed surface at right angles at the time of engagement with the sprocket, so that the pin hole inner surface and the pin come into uniform contact with each other, with no deflected load applied.

Therefore, by subjecting the engaging surface to shaving, the wear of the pin hole inner surface of the plate and the pin inserted therein is further diminished. Besides, the area of contact between the sprocket toothed surface and the engaging surface of the shaved plate increases, affording a uniformly engaged state, with diminished wear of the two.

In the case where a high carbon steel with a carbon content of 0.7% to 1.1% is used as the material for the pin, the affinity between the surface of the pin material and the hard layer is high, so that a hard layer is formed which is stable and the hardness and strength of the pin surface layer are enhanced.

BRIEF DESCRIPTION OF THE DRAWING FIGURES

DETAILED DESCRIPTION OF THE INVENTION

The present invention will now be described in detail with reference to the drawings.

Figure 4:
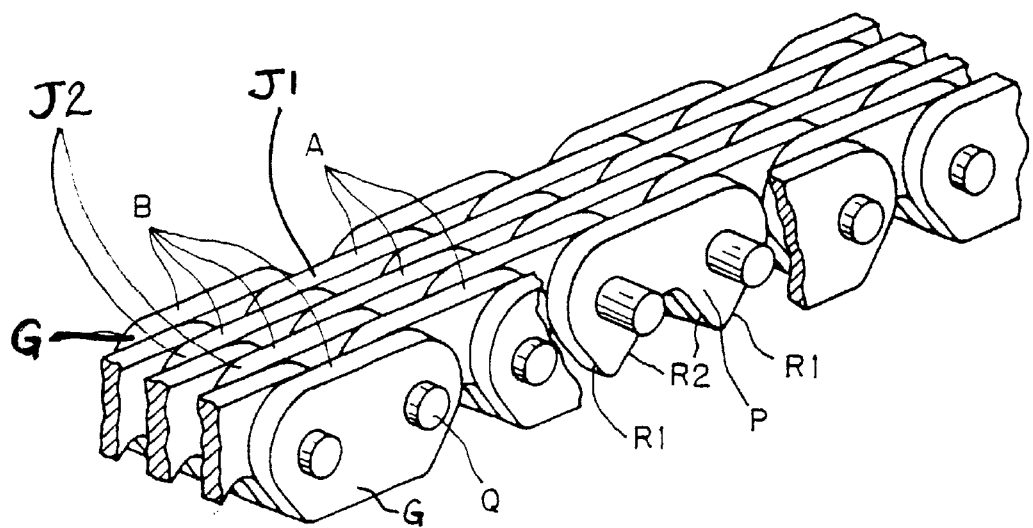
FIG. 4 is a perspective view showing a structure of a silent chain.
Figure 5:
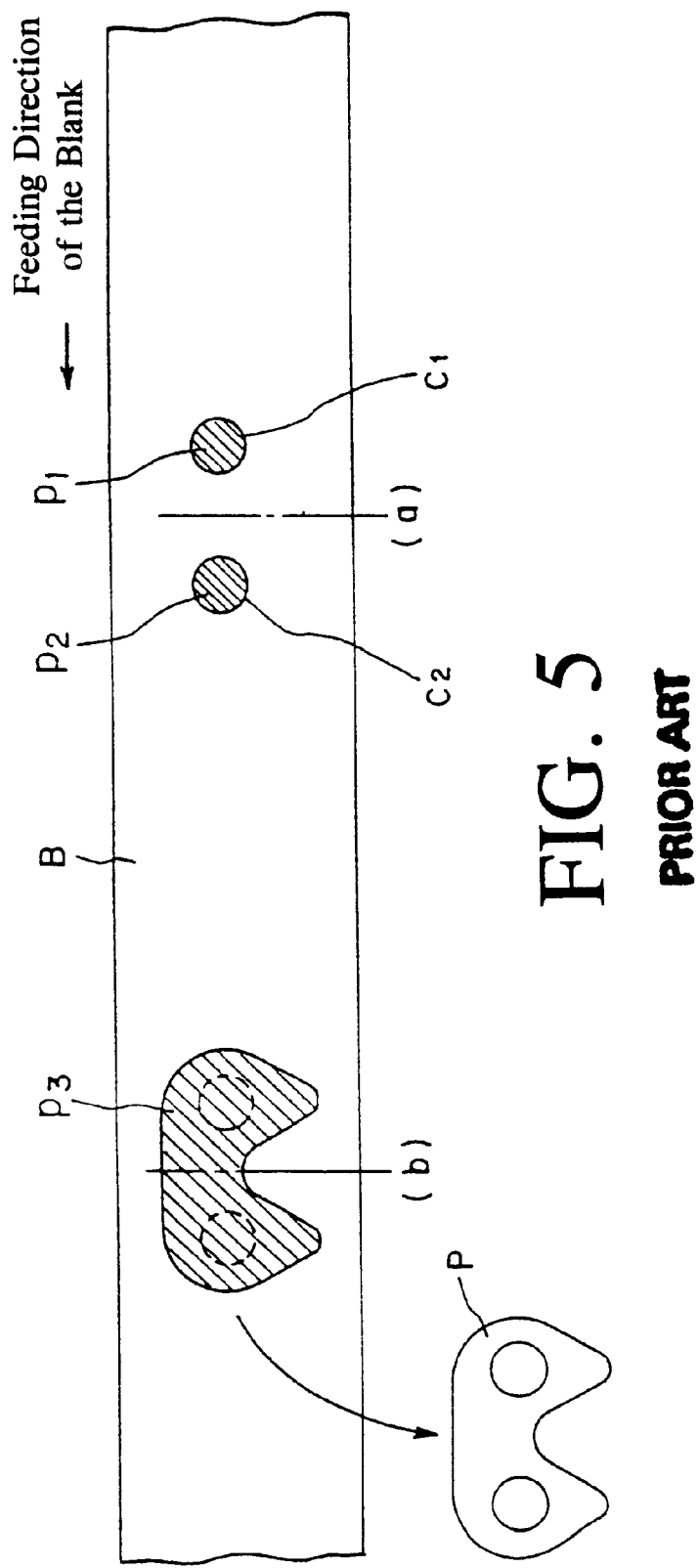
FIG. 5 is a schematic diagram showing a conventional plate manufacturing process for a conventional silent chain.
Figure 6:
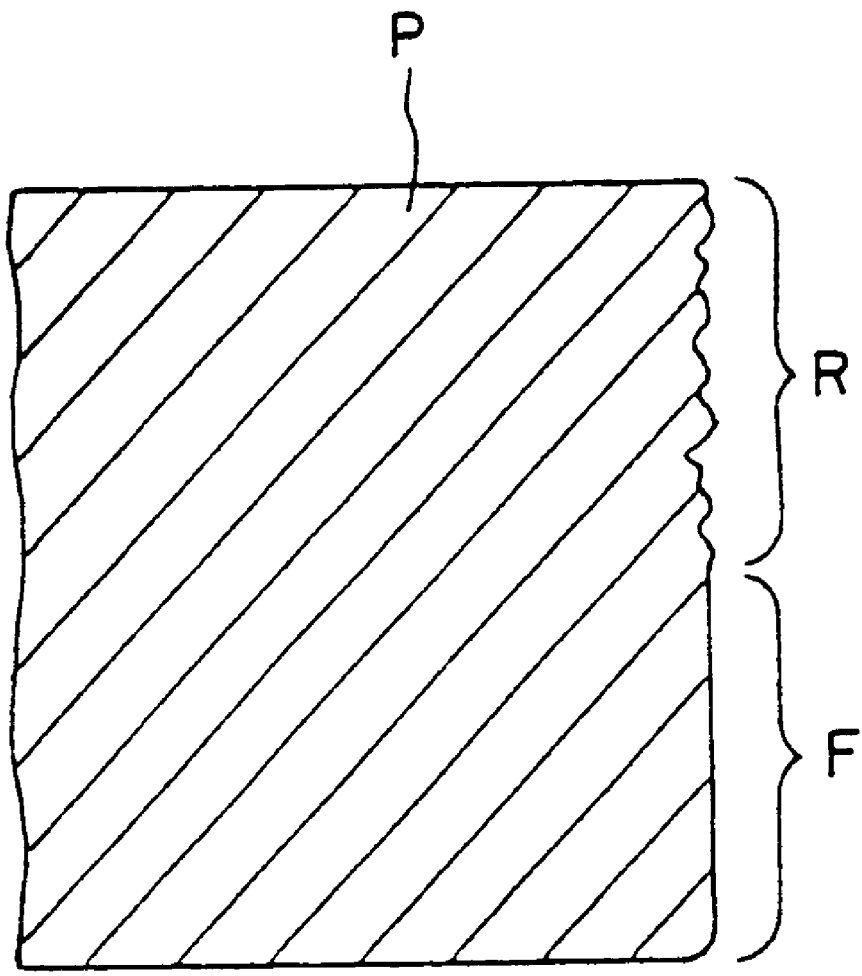
FIG. 6 is a cross-sectional view showing the state of a punched portion of a plate used in the conventional silent chain.

FIG. 4 illustrates a silent chain for use in an engine or similar. The silent chain, unlike a roller chain, includes a large number of plates which are bifurcated on one side. The silent chain includes a plurality of joint trains of plates A and a plurality of guide trains of plates B. Each of the joint train of plates A has at least two joint plates J1 arranged in a row. Each of the guide trains of plates B has two guide plates G at both sides thereof and at least one joint plate J2 between the guide plates G all arranged in a row. The plates are superimposed and connected together using pins Q. In an outer engagement type silent chain, two surfaces RI, located outside the bifurcated portion, serve as surfaces for engagement with a sprocket. In contrast, in an inner engagement type silent chain, two surfaces R2, located inside the bifurcated portion, serve as surfaces for engagement with a sprocket.

Figure 1:
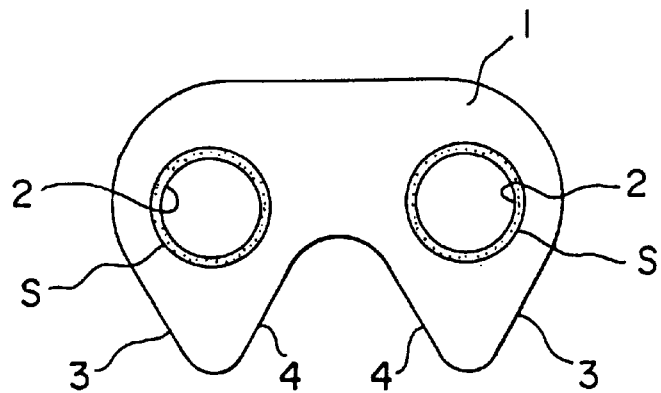
FIG. 1 is a side view of a plate used in a silent chain according to a first embodiment of the present invention.

FIG. 1 is a side view of a plate used for both the joint trains of plates and the guide trains of plates in a silent chain according to the first embodiment of the present invention. The plate, indicated at 1, has two pin holes 2, 2 and surfaces 3, 4 for engagement with a sprocket when assembled as a silent chain. The plate 1 is formed by punching a steel blank, and the inner surfaces of the pin holes 2, 2 have been subjected to shaving as indicated by the reference mark S.

Figure 2:
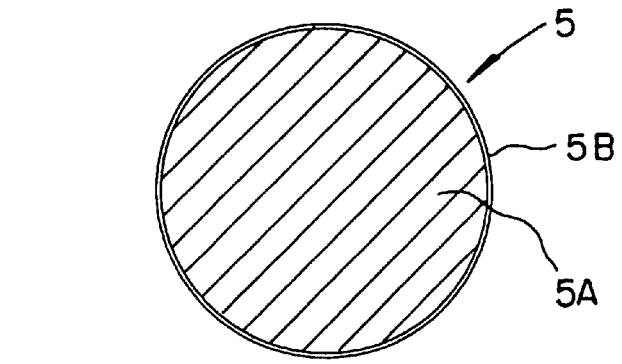
FIG. 2 is a cross-sectional view through a chain pin used in the silent chain of the first embodiment.

FIG. 2 illustrates the section of a pin which is inserted into each pin hole formed in the plate 1. As shown in the same figure, a pin 5 has a hard layer 5B of CrC having a thickness of 6 to 20 $\mu$m formed on the surface of a pin material 5A which is a high carbon steel containing 0.7% to 1.1% of carbon, to enhance the surface hardness to Hv 1800 or more.

The material of the hard layer 5B is not limited to CrC, but may be formed of any one of such metal carbides as TiC, VC and NbC, or a composite of a plurality of such metal carbides.

Figure 3:
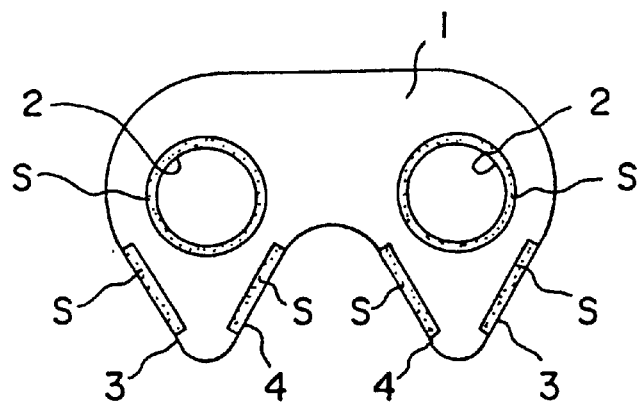
FIG. 3 is a side view of a plate used in a silent chain according to a second embodiment of the present invention.

FIG. 3 is a side view of a plate used for both joint trains of plates and guide trains of plates in a silent chain according to the second embodiment of the present invention. In the plate 1 shown in FIG. 3, the inner surfaces of pin holes 2, 2 have been subjected to shaving as indicated by the reference mark S, similarly to the plates of the first embodiment. In addition, engaging surfaces 3 and 4 for engagement with the sprocket have also been subjected to shaving.

Also in the second embodiment, the pin 5, which has a hard layer SB of a metal carbide on the surface of the pin material 5A as shown in FIG. 2, is inserted into each pin hole 2 of the plate 1 to assemble a silent chain.

Figure 7:
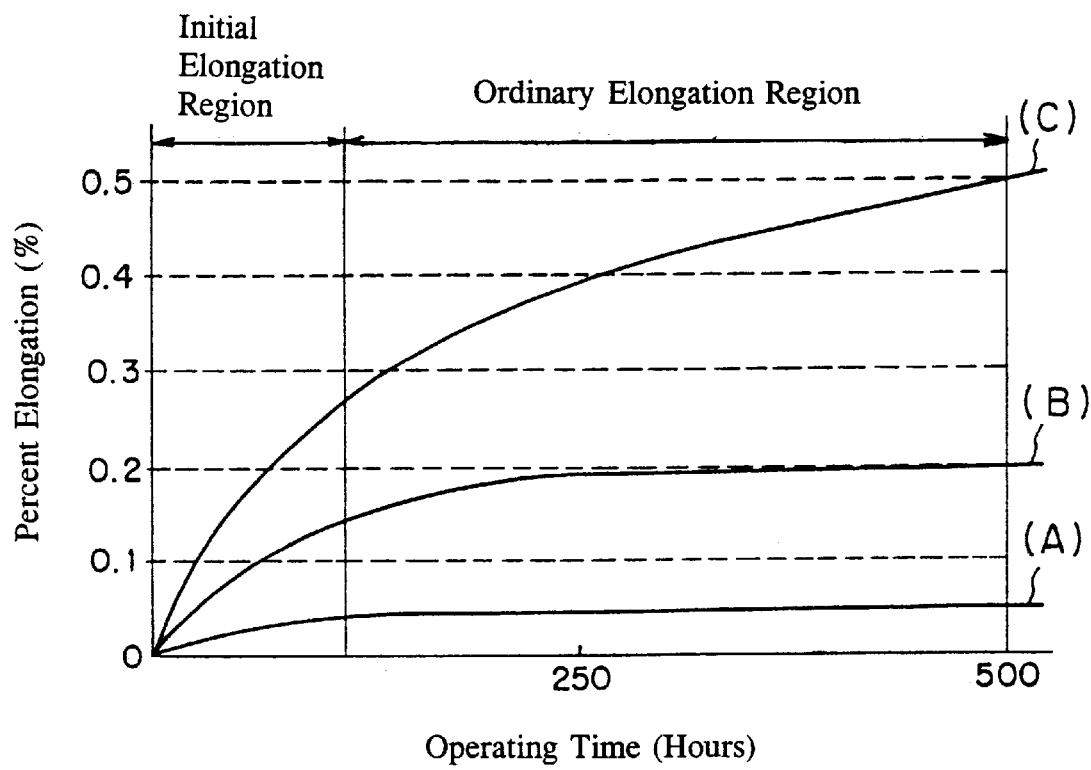
FIG. 7 is a graph showing operating time vs. changes in percent elongation of silent chains according to the present invention and a conventional silent chain.

Referring now to FIG. 7, the results of comparative tests conducted for the following silent chains (A), (B) and (C)

with respect to operating time vs. change in percent elongation are graphically shown. The silent chain (A) was assembled in the following manner. Plates, whose pin hole inner surfaces and sprocket engaging surfaces had been subjected to shaving over an area of approximately 70% of the plate thickness, were connected together by pins, where in each pin had a 6 to 20 μm thick CrC layer as a hard metal carbide layer on the surface of the high carbon steel material of the pin. The high carbon steel of the pin should have a carbon content of between 0.7 to 1.1%.

The silent chain (B) was assembled in the following manner. Plates, whose pin hole inner surfaces and sprocket engaging surfaces had been subjected to shaving over an area of approximately 70% of the plate thickness, were connected together by pins obtained by carburizing the surface of a low carbon steel material of the pin, the low carbon steel having a carbon content of 0.1 to 0.3%.

The silent chain (C), which is a conventional silent chain, was obtained in the following manner. Plates with punched pin holes were connected together by pins obtained by carburizing the surface of a low carbon steel material of the pin, the low carbon steel having a carbon content of 0.1 to 0.3% like the pins used in the silent chain (B).

As is seen from FIG. 7, in the conventional silent chain (C), the percent elongation reached 0.5% when the operating time exceeded 500 hours and thereafter, it increased gradually. On the other hand, in the silent chain (A) wherein plates having shaved pin hole inner surfaces and shaved sprocket engaging surfaces are combined with pins each having a hard metal carbide layer on the surface thereof, the percent elongation is 0.05% and thus, about 10% of that of the conventional silent chain (C). In the silent chain (A), moreover, the percent elongation after having reached 0.5% is almost constant regardless of the operating time.

In the silent chain (B) using plates having shaved pin hole inner surfaces and sprocket engaging surfaces and using pins which have been subjected to a carburizing treatment, the percent elongation after the lapse of 500 hours in operating time is 0.2%. This is inferior to that of the silent chain (A), but it is only about 40% of the percent elongation of the conventional silent chain (C). Besides, unlike the conventional silent chain (C), the silent chain (B) does not show a further increasing tendency of its percent elongation even with increased operating time.

In the above embodiments the shaving of the inner surfaces of the pin holes 2 formed in each plate 1 and the sprocket engaging surfaces 3 and 4 will be effective in practical use if the shaving is performed at an allowance for machining of about 0.1 mm and over an area of about 70% or more of the thickness of the plate 1.

Although in each of the above embodiments the pin hole inner surfaces of all the plates in the silent chain are subjected to shaving, a practical effect can be obtained if the pin hole inner surfaces of at least the joint trains of plates are subjected to shaving.

With respect to the shaving of the sprocket engaging surfaces of each plate, it is effective even if applied to only one of the joint trains of plates and the guide trains of plates.

Further, although in each of the above embodiments a high carbon steel containing 0.7 to 1.1% of carbon is used as the material of pin, even a low carbon steel containing 0.1 to 0.4% of carbon may be used as the material of pin after being subjected to a carburizing treatment to increase the surface layer carbon content to 0.7 to 1.1%.

In the silent chain of the present invention, as set forth above, the inner surfaces of pin holes formed in at least the joint trains of plates are subjected to shaving and a hard layer of at least one hard metal carbide selected form CrC, TiC, VC and NbC is formed on the surface of each pin. Therefore, the shaving increases the area of contact between the inner surface of each pin hole and the pin inserted therein and improves the perpendicularity between the plate plane and the pin hole inner surface. Thus, even when a constant tension is acting on the chain, it is possible to reduce the surface pressure applied between the pin hole inner surface and the pin in comparison with the conventional silent chain.

The hard metal carbide layer formed on the pin surface has a surface hardness of Hv 1800 or more and thus is very hard. So wear does not usually occur even when a slight amount of a solid component is mixed in the lubricating oil, or similar, and the solid component contacts the pin surface. Besides, since the hard layer in question is also chemically stable, the affinity thereof for the pin hole inner surface of each plate is small. Thus, even under the condition of boundary lubrication, adhesion does not usually occur between the pin hole inner surface and the pin inserted therein. Besides, the contact portion of the pin hole inner surface and pin does not usually corrode, even with sulfuric acid or any other corrosive component contained in the diesel engine oil or similar lubricating the contact portion.

Consequently, the wear of the pin hole inner surface and that of the pin inserted therein can be minimized and elongation based on wear is diminished as compared with the conventional silent chain, thus permitting a high accuracy to be maintained over a long period of time in use.

Moreover, in the case where the sprocket engaging surfaces of at least one of the joint trains of plates and guide trains of plates are shaved, the plates having such shaved engaging surfaces each come into perpendicular abutment with the sprocket toothed surface at the time of engagement with a sprocket, so that the pin hole inner surface and the pin inserted therein come into parallel contact with each other. Hence, a deflected load may be prevented from occurring.

Consequently, the wear of the pin hole inner surface and that of the pin inserted therein are further diminished, whereby not only the elongation based on wear of the silent chain is suppressed and the fatigue strength is improved, but also vibrations and noises generated upon engagement of each plate with the sprocket can be diminished. Besides, since the area of contact between the sprocket toothed surface and the plate engaging surfaces increases and the state of engagement of the two surfaces becomes uniform, the wear of the two surfaces can also be reduced.

Further, in the case where a high carbon steel containing 0.7 to 1.1% of carbon is used as the material of the pin, the hardness and strength of the pin surface layer become high enough to withstand a high surface pressure because the affinity between the surface of the pin material and the hard layer is high and the hard layer is stable.

We claim:
1. A silent chain having joint trains of metal plates and guide trains of metal plates wherein said joint trains of metal plates and said guide trains of metal plates are adjacent to each other and are connected together by pins, an improvement comprising:

inner surface of pin holes press-formed in at least said joint trains of metal plates having been subjected to shaving to improve the surface roughness of said inner surfaces of said press-formed pin holes and the perpendicularity of said inner surface of each of said press-formed pin holes in each said metal plate with respect to the plane of the metal plate, and a hard layer of at least one hard metal carbide selected from the group consisting of CrC, TiC, VC and NbC is formed on a surface of each pin of said pins.

2. The silent chain according to claim 1, wherein engaging surfaces of at least one of said joint trains of metal plates and said guide trains of metal plates for engagement with a sprocket are pressed-formed engagement surfaces and having been subjected to shaving to improve the surface roughness of said engagement surfaces and the perpendicularity of said press-formed engagement surface of each of said metal plate with respect to the plane of the metal plate.

3. The silent chain according to claim 1 or claim 2, wherein a high carbon steel containing 0.7% to 1.1% of carbon is used as the material of each pin of said pins.

* * * * *